United States Patent [19]

Kubo et al.

[11] Patent Number: 4,988,794
[45] Date of Patent: Jan. 29, 1991

[54] POLYESTER RESIN FOR TONER AND PROCESS FOR ITS PRODUCTION

[75] Inventors: Shinji Kubo; Ryo Funato, both of Nagoya; Noriyuki Tajiri, Toyohashi; Hirokazu Ito, Toyohashi; Hitoshi Iwasaki, Toyohashi, all of Japan

[73] Assignee: Mitsubishi Rayon Company Limited, Tokyo, Japan

[21] Appl. No.: 485,762

[22] Filed: Feb. 26, 1990

Related U.S. Application Data

[63] Continuation of Ser. No. 343,499, Apr. 26, 1989, abandoned, which is a continuation of Ser. No. 190,099, May 4, 1988, abandoned.

[30] Foreign Application Priority Data

May 13, 1987 [JP] Japan ................................ 62-116414

[51] Int. Cl.$^5$ ............................................. C08G 63/02
[52] U.S. Cl. .................................... 528/272; 528/300; 528/302; 528/308; 528/308.6; 525/437; 430/109
[58] Field of Search ............... 528/272, 300, 302, 308, 528/308.6; 525/437; 430/109

[56] References Cited

U.S. PATENT DOCUMENTS

| 4,298,724 | 11/1981 | Sommerfield et al. | 528/302 |
| 4,533,614 | 8/1985 | Fukumoto et al. | 430/99 |
| 4,533,617 | 8/1985 | Inoue et al. | 430/111 |
| 4,804,622 | 2/1989 | Tanaka et al. | 430/109 |
| 4,849,495 | 7/1989 | Funato et al. | 528/194 |

FOREIGN PATENT DOCUMENTS

| 2435894 | 4/1975 | Fed. Rep. of Germany . |
| 2056472 | 3/1981 | United Kingdom . |
| 2100873 | 1/1983 | United Kingdom . |

Primary Examiner—John Kight, III
Assistant Examiner—Sam A. Acquah
Attorney, Agent, or Firm—Cushman, Darby & Cushman

[57] ABSTRACT

A polyester resin for toner, which consists essentially of (a) from 0.5 to 50 mol %, based on the entire alcohol components, of at least one trihydric or higher polyhydric alcohol, (b) from 50 to 99.5 mol %, based on the entire alcohol components, of at least one diol and (c) at least one member selected from the group consisting of dicarboxylic acids and lower alkyl esters thereof, and which has a softening temperature of from 90° to 170° C., a glass transition temperature (Tg) of from 30° to 70° C., an acid value of from 0.5 to 15 mgKOH/g and a gel content of from 1.5 to 40%.

4 Claims, No Drawings

POLYESTER RESIN FOR TONER AND PROCESS FOR ITS PRODUCTION

This is a continuation of application Ser. No. 07/343,499, filed Apr. 26, 1989, which was abandoned upon the filing hereof, which was a continuation of 07/190,099 which was filed May 4, 1988, now abandoned.

The present invention relates to a polyester resin for dry toner to be used for developing an electrostatic image in electrophotography, electrographic recording or electrostatic printing, and a process for its production. More particularly, it relates to a polyester resin for dry toner having excellent offset resistance and excellent electrical properties, and a process for its production.

In a method for forming a permanent visible image from an electrostatic latent image, an electrostatic latent image formed on a photoconductive photosensitive material or on an electrographic recording material is developed by means of a preliminarily triboelectrically charged toner, followed by fixing. The fixing is conducted either by directly fusing the toner image formed by the development on the photoconductive photosensitive material or on the electrographic recording material, or be transferring the toner image on a paper or film and then fusing it on a transfer sheet. The fusing of the toner image is conducted by contacting with a solvent vapor, pressing or heating. The heating system includes a non-contact heating system by means of an electric oven and a press-heating system by means of heat rollers. The latter is mainly used recently, since a high speed is required for the fixing step.

Toners which may be used for a dry development system include a one component toner and a two component toner. The two component toner is prepared by firstly melt-mixing a resin, a coloring agent, a charge controlling agent and other necessary additives to adequately disperse them, followed by rough pulverization, fine pulverization and classification into a predetermined range of particle size. The one component toner is prepared in the same manner by adding a magnetic iron powder in addition to the above-mentioned various components for the two component toner.

The resin is the main component of a toner and thus governs the major properties required for the toner. Therefore, the resin for toner is required to provide good dispersibility of a coloring agent in the melt mixing step and excellent pulverizability in the pulverization step in the production of a toner. Further, in the use of the toner, it is required to provide various properties such as excellent fixing properties, offset preventing properties, blocking resistance and electrical properties. As resins useful for the production of toners, epoxy resins, polyester resins, polystyrene resins, methacrylate resins, etc. are known. For the press-heating fixing system, styrene (meth)acrylate copolymers have been mainly used. However, any attention has recently been drawn to polyester resins, since it is possible to conduct fixing at a low temperature and the fixed toner image is excellent in the resistance against a polyvinyl chloride plasticizer.

A polyester resin is produced usually by a condensation reaction of a dicarboxylic acid or its lower alkyl ester with a diol by direct esterification or by ester interchange. For a polyester resin for toner, it has been proposed to use in addition to the above monomers a trivalent or higher polyvalent carboxylic acid or alcohol for co-polycondensation to form a weakly crosslinked structure to provide offset resistance during the fixing step. However, toners prepared by using conventional polyester resins obtained by such co-polymerization with a trivalent or higher polyvalent carboxylic acid or alcohol had drawbacks such that the electrical properties were poor i.e. the negative changeability was substantial, the humidity dependency of the electrification was substantial, and the image quality varied depending upon the environment, and an improvement has been desired.

The present inventors have studied the conventional technique to find out the reason why the electrical properties of the toner deteriorate by the co-polycondensation of a trifunctional monomer while the offset resistance of the toner can be thereby improved, and have found that such a deterioration is attributable to a high acid value of the polyester resin. Namely, in order to obtain excellent offset resistance by the co-polycondensation of a trifunctional monomer, it is usually required to let the condensation reaction proceed until a suitable crosslinked structure is formed. However, the viscosity of the reaction system tends to increase rapidly so that the product can not be taken out from the reactor, or the reaction is hardly controllable, whereby it used to be difficult to obtain the desired resin. Therefore, it was necessary to take out the polymer without permitting it to react to have an adequate crosslinked structure. Consequently, the intended improvement of the offset resistance could not be attained, or the condensation reaction could not be adequately conducted so that the resin tended to have a high acid value, whereby the electrical properties were poor. Namely, in the conventional technique, it was difficult to satisfy both requirements i.e. to provide a suitable crosslinked structure necessary for offset resistance and to provide a low acid value necessary for excellent electrical properties, simultaneously.

The present inventors have conducted extensive researches to solve such problems and have found a polyester resin having both excellent offset resistance and electrical properties and a process for its production.

The present invention provides a polyester resin for toner, which consists essentially of (a) from 0.5 to 50 mol %, based on the entire alcohol components, of at least one trihydric or higher polyhydric alcohol, (b) from 50 to 99.5 mol %, based on the entire alcohol components, of at least one diol and (c) at least one member selected from the group consisting of dicarboxylic acids and lower alkyl esters thereof, and which has a softening temperature of from 90° to 170° C., a glass transition temperature (Tg) of from 30° to 70° C., an acid value of from 0.5 to 15 mgKOH/g and a gel content of from 1.5 to 40%.

The present invention also provides a process for producing a polyester resin for toner by the condesation reaction of (a) from 0.5 to 50 mol %, based on the entire alcohol components, of at least one trihydric or higher polyhydric alcohol, (b) from 50 to 99.5 mol %, based on the entire alcohol components, of at least one diol and (c) at least one member selected from the group consisting of dicarboxylic acids and lower alkyl esters thereof in the presence of a catalyst, which comprises reacting the polyhydric alcohols (a) and (b) and the dicarboxylic acid components (c) for esterification or ester interchange under a condition to satisfy the formula:

$$\frac{\{f - (f-2)g\}\{1 + (f-2)g\}}{f} - 0.2 \leq r \quad (1)$$

where $$r = \frac{\text{mols of polyhydric alcohols (a) and (b)}}{\text{mols of dicarboxylic acid components (c)}}$$

$f$ = valency of trihydric or higher polyhydric alcohol having the highest valency $$g = \frac{\text{mols of trihydric or higher polyhydric alcohol}}{\text{mols of entire alcohols}}$$

followed by crosslinking while distilling off the diol (b) under a reduced pressure of at most 150 mmHg, wherein the crosslinking reaction rate is substantially controlled by raising the pressure of the reaction system with an increase of the viscosity of the polymer.

Now, the present invention will be described in detail with reference to the preferred embodiments.

The trihydric or higher polyhydric alcohol (a) which may be used in the present invention includes, for example, sorbitol, 1,2,3,6-hexanetetrol, 1,4-sorbitane, pentaerythritol, dipentaerythritol, tripentaerythritol, cane sugar, 1,2,4-butanetriol, 1,2,5-pentatriol, glycerol, 2-methylpropanetriol, 2-methyl-1,2,4-butanetriol, trimethylolethane, trimethylolpropane and 1,3,5-trihydroxymethylbenzene. These alcohols may be used alone or in combination as a mixture.

The diol (b) which may be used in the present invention includes aliphatic or aromatic diols. Specific examples of the aliphatic diols include, for example, ethylene glycol, neopentyl glycol, butanediol and polyethylene glycol. Among them, ethylene glycol, neopentyl glycol and butanediol are preferred from the viewpoint of fixing properties. Specific examples of the aromatic diols include, for example, polyoxypropylene-(n)-polyoxyethylene-(n')-2,2-bis(4-hydroxyphenyl)propane, polyoxypropylene (n)-2,2-bis(4-hydroxyphenyl)propane, polyoxyethylene (n)-2,2-bis(4-hydroxyphenyl)propane, polyoxypropylene n)-hydroquinone (wherein each of n and n' is a number of from 2 to 6 ). These diols may be used alone or in combination as a mixture.

In the present invention, the trihydric or higher polyhydric alcohol (a) is contained in an amount of from 0.5 to 50 mol %, preferably from 1 to 35 mol %, based on the entire alcohol components, and the diol (b) is contained in an amount of from 50 to 99.5 mol %, preferably from 65 to 99 mol %, based on the entire alcohol components. If the trihydric or higher polyhydric alcohol (a) is less than 0.5 mol %, the offset resistance tends to be low. On the other hand, if it exceeds 50 mol %, the blocking resistance tends to be low.

The dicarboxylic acid or its low alkyl ester (c) which may be used in the present invention includes, for example, terephthalic acid, isophthalic acid, sebacic acid, isodecyl succinic acid, maleic acid and fumaric acid and monomethyl-, monoethyl-, dimethyl- and diethyl-esters thereof. Among them, terephthalic acid, isophthalic acid and dimethylesters thereof are particularly preferred from the viewpoint of the blocking resistance and costs. Such a dicarboxylic acid or its lower alkyl ester substantially affects the fixing properties and the blocking resistance of the toner. Namely, when an aromatic acid such as terephthalic acid or isophthalic acid is used in a substantial amount, the fixing properties tend to be low while the blocking resistance may be improved, although such tendency depends also on the degree of condensation. On the other hand, when an aliphatic acid such as sebacic acid, isodecyl succinic acid, maleic acid or fumaric acid is used in a substantial amount, the blocking resistance tends to be low while the fixing properties may be improved. Therefore, such dicarboxylic acids may suitably be used alone or in combination depending upon the compositions or proportions of other monomers and the degree of condensation.

The most important point of the present invention is that the resin obtained by the condensation of the above-mentioned monomers is a polyester having a softening point of from 90° to 170° C., a glass transition temperature (Tg) of from 30° to 70° C., an acid value of from 0.5 to 15 mgKOH/g and a gel content of from 1.5 to 40%.

If the softening temperature is lower than 90° C., the blocking resistance tends to be poor although the fixing properties may be good. On the other hand, if the softening temperature exceeds 170° C., the fixing properties tend to be poor. Therefore, the softening temperature should be within a range of from 90° to 170° C., preferably from 100° to 160° C.

An addition of inorganic powder such as silica to a toner is effective for the improvement of the blocking resistance. Such an effect is remarkable particularly when Tg of the binder is low. When, Tg is at a level of from 50° to 70° C., the blocking resistance is good even without an addition of inorganic powder. However, if Tg is lower than 30° C., the fixing properties will be good, but the blocking resistance tends to be extremely poor and it can not adequately be improved even by an addition of inorganic powder. On the other hand, if Tg exceeds 70° C., the fixing properties tend to be poor. Therefore, Tg should be within a range of from 40° to 70° C, preferably from 50° to 70° C.

If the acid value is less than 0.5 mgKCH/g, the dispersibility of a coloring agent tends to be low. On the other hand, if it exceeds 15 mgKOH/g, the negative chargeability tends to be substantial, and the humidity dependency of the chargeability tends to be substantial and the image quality varies depending upon the environment. Therefore, the acid value should be within a range of from 0.5 to 15 mgKOH/g, preferably from 1 to 15 mgKOH/g.

If the gel content is less than 1.5%, the fixing properties may be improved, but the offset resistance required for a toner tends to be poor. On the other hand, if the gel content exceeds 40%, the offset resistance may be good, but the fixing properties tend to be extremely poor. Therefore, the gel content should be within a range of from 1.5 to 40%, preferably from 5 to 30%.

Now, the process for the production of the polyester resin of the present invention will be described.

In the present invention, the esterification reaction or the ester interchange reaction is conducted by hearing a mixture comprising the trihydric or higher polyhydric alcohol (a), the diol (b) and the dicarboxylic acid component (c) under such a condition that the molar ratio (r) of the polyhydric alcohols (a) and (b) to the dicarboxylic acid component (c) satisfies the formula (1) given hereinbefore. For this reaction, it is possible to use an esterification or ester interchange catalyst which is commonly used for an esterification or ester interchange reaction, such as sulfuric acid, titanium butoxide, dibutyltin oxide, magnesium acetate or manganese acetate, as the case requires. In the present invention, the amount of the dicarboxylic acid component (c) is required to satisfy the above formula (1) in order to prevent gelation during the esterification or ester interchange reaction.

Then, after the esterification or ester interchange reaction, water or an alcohol formed by the reaction is removed by a conventional method.

In the present invention, the polymerization reaction will follow. The polymerization is conducted under a reduced pressure of at most 150 mmHg while distilling off the diol component (b). For the polymerization, a usual known polymerization catalyst such as titanium butoxide, dibutyltin oxide, tin acetate, zinc acetate, tin disulfide, antimony trioxide or germanium dioxide may be employed.

In this reaction, the crosslinking polymerization reaction proceeds as the diol component (b) is distilled off. Thus, it is possible to obtain a polyester having a desired crosslinking degree by controlling the amount of the distillation of the diol component (b). Therefore, in the present invention, a product having a desired crosslinking degree can be obtained simply by controlling the vacuum degree (i.e. simply by raising the pressure of the system) during the polymerization reaction.

With respect to the polymerization temperature and the amount of the catalyst, there is no particular restriction, and they may suitably be set as the case requires.

The distillation of the diol component (b) is determined by the vacuum degree and the temperature of the reaction system. The vacuum degree is preferably at most 150 mmHg, more preferably at most 30 mmHg, taking into consideration the pressure condition of the system to terminate the polymerization reaction.

By such a specific manner of operation, it is for the first time possible to produce a polyester which satisfies both a low acid value at a level of from 0.5 to 10 mgKOH/g required to provide excellent electrical properties and a gel content of from 1.5 to 40% required to provide adequate offset resistance when used as a toner.

In the present invention, the softening temperature of the polyester resin is a temperature at which one half of 1 g of a sample flows out when measured by means of Flow Tester CFT-500 (manufactured by Shimadzu Corporation) with a nozzle of 1 mm in diameter×10 mm under a load of 30 kg at a constant temperature raising rate of 3° C./min.

Tg is a temperature at the intersection of the base line of a chart and the tangent line of an absorption curve in the vicinity of Tg when measured by means of a differential scanning calorimeter at a temperature raising rate of 10° C./min.

The acid value is the mg value of KCH required for neutralization by a usual neutralizing titration with a KCH solution.

For the determination of the gel content, 0.5 g of a sample is put into 50 ml of tetrahydrofuran and dissolved under heating at 70° C. for 3 hours, and the solution is filtered through a glass filter packed with Cellite #545, followed by drying thoroughly in a vacuum dryer at 80° C., whereupon the dry weight is divided by the initial weight to obtain a gel content. Namely, the gel content is a value obtained by dividing the dry weight of the product by the initial weight of the sample.

Now, the present invention will be described with reference to Examples. However, it should be understood that the present invention is by no means restricted by such specific Examples.

EXAMPLE 1

Isophthalic acid, terephthalic acid, pentaerythritol, trimethylol propane and ethylene glycol were introduced into a reactor having a distillation column in the proportions as identified in Table 1. Further, into the reactor dibutyltin oxide was added in an amount of 0.03% by weight based on the entire acid components, and the esterification reaction was conducted under atmospheric pressure while maintaining the internal temperature at a level of 220° C. and the rotational speed of the stirrer at a level of 200 rpm. About 4.5 hours after the initiation of distillation of water, the reaction system became transparent, and the distillation of water terminated, whereby the torque meter of the stirrer showed 0.9 kg-cm. Then, while maintaining the internal temperature at 235° C. and the stirring rotational speed at 200 rpm, the pressure in the reaction system was reduced to 1.0 mmHg, whereby ethylene glycol was distilled from the reaction system, and the stirring torque gradually increased. About 1.5 hours later, when the stirring torque reached 1.2 kg-cm, gelation started, whereupon the stirring torque started to increase rapidly. Then, the pressure of the reaction system was changed to 15 mmHg, whereupon the increasing rate of the stirring torque was moderated, and about 20 minutes later, the stirring torque reached 3.0 kg-cm. Then, the pressure in the reaction system was changed to atmospheric pressure, and the stirring was continued in this state for about one hour, during which the stirring torque was substantially at a constant level of 3.05 kg-cm.

This example shows that the crosslinking degree of the polymer i.e. the stirring torque or the viscosity can readily be controlled by controlling the pressure in the reaction system, and yet it is possible to substantially prevent the gelation reaction.

The products R1, R2 and R3 were all slightly yellow and had the physical properties as identified in Table 1.

Then, 95 parts by weight of these resins were, respectively, melt-mixed with 5 parts by weight of carbon black by means of a twin screw extruder, cooled and then pulverized by a jetmill and subjected to a classifying machine to obtain toners T1, T2, and T3 having a particle size of from 5 to 20 μm.

To 5 parts by weight of these toners, 95 parts by weight of iron powder carrier was added, and copying was conducted by means of an electrophotographic copying machine for polyester toner modified so that the temperature of the fixing section could optionally be changed. Under different atmospheric conditions, continuous copying of 5,000 copies was perfomed at a rate of 30 copies per minute, whereby the properties were evaluated. The results are shown in Table 1-1. No offset was observed within a wide temperature range, and the fixing properties were good. The image quality was excellent at a normal temperature (20° C.) at a normal humidity (relative humidity of 60%). Then, under a high temperature high humidity condition and under a low temperature low humidity condition, the image quality decreased to some extent, but the quality was still in a practically acceptable range.

Each toner was put in a container and left at 50° C. for 24 hours, whereupon it was examined and found to be substantially free from blocking and thus had no practical problem.

In the present invention, the evaluation of various properties of the toner was conducted by the following methods.

1. Offset resistance: Continuous copying was performed by changing the temperature of the fixing roller by every 5° C., whereby the degree of offset was evaluated with 5 ratings of from A (best) to E (worst) (practically acceptable upto C).

2. Fixing properties: The solid print portion obtained by copying at a fixing temperature of 180° C. was rubbed with a rubber eraser, and the fixing properties were evaluated by the degree of removal with 5 ratings of from A (best) to E (worst) (practically acceptable upto C).

3. Blocking resistance: The degree of blocking was evaluated with 5 ratings.

A: No blocking
B: Slight tendency for blocking, but by gently shaking upside down, the initial state can readily be restored.
C: Slight blocking is observed, but by shaking upside down, the practically useful state is regained.
D: Substantial blocking is observed, and when rubbed with fingers, the blocks disintegrate, but the initial state can not be restored.
E: Complete blocking, and the blocks do not disintegrate even when rubbed with fingers.

4. Image qualilty: The copied image quality of the test pattern was visually evaluated with 5 ratings.

A: Excellent
B: Good
C: Slight fogging observed, but practially acceptable.
D: Fogging observed, and practically objectionable.
E: Substantial fogging observed, very bad.

COMPARATIVE EXAMPLE 1

Terephthalic acid, trimethylolpropane and ethylene glycol were charged to a reactor having a distillation column in the proportions as identified in Table 1. The esterification reaction was conducted under atmospheric pressure under the same conditions as in Example 1 with respect to the catalyst, the temperature condition and the stirring rotational speed. Upon expiration of 4.1 hours from the initiation of the distillation of water formed by the esterification reaction, the viscosity of the reaction solution started to increase, and then nitrogen was blown into the reactor to raise the pressure in the reactor to 3 kg/cm², but the gelation reaction did not stop and finally it became impossible to continue stirring.

This Comparative Example shows that the control of the gelation reaction is impossible at the esterification reaction stage.

TABLE 1

| Resins | | | Example 1 Comparative R1 | R2 | R3 | Comparative Example 1 (Unit: mol %) |
| --- | --- | --- | --- | --- | --- | --- |
| Mol ratio of entire alcohols to entire carboxylic acids | | | 1.1 | 1.3 | 1.5 | 1.03 |
| Acid components | Dicarboxylic acid | Terephthalic acid | 60 | 60 | 60 | 100 |
| | | Isophthalic acid | 40 | 40 | 40 | — |
| Alcohol components | Polyhydric alcohol | Pentaerythritol | 3 | 10 | | |
| | | Trimethylol propane | | | 34 | 50 |
| | Aromatic diol | Diol A (*1) | | 20 | 20 | |
| | Aliphatic diol | Ethylene glycol | 97 | 70 | 46 | 50 |
| Physical properties of resins | | Softening temp. (°C.) | 146 | 130 | 124 | — |
| | | Tg (°C.) | 53 | 51 | 51 | — |
| | | Acid value (mgKOH/g) | 1.75 | 1.40 | 1.12 | — |
| | | Gel content (%) | 8.2 | 12.5 | 18.7 | — |

(*1) Diol A: Polyoxypropylene (2.2)-2,2-bis(4-hydroxyphenyl) propane

TABLE 1-1

| Toners | | T1 | | | T2 | | | T3 | | |
| --- | --- | --- | --- | --- | --- | --- | --- | --- | --- | --- |
| Offset resistance | | 158–240 | | | 155–240 | | | 148–240 | | |
| Fixing properties | | B | | | A | | | A | | |
| Blocking resistance | | B | | | C | | | C | | |
| Copying conditions & image qualities | Temp. (°C.) | 20 | 10 | 35 | 20 | 10 | 35 | 20 | 10 | 35 |
| | Humidity (%) | 60 | 15 | 85 | 60 | 15 | 85 | 60 | 15 | 85 |
| | Image quality | A | B | B | A | B | B | A | B | B |

EXAMPLE 2

Resins R4 and R5 were prepared in the same manner as in Example 1, except that trimethylolpropane was used as the polyhydric alcohol and the composition of the monomers was changed as shown in Table 2. The physical properties of these resins are shown in Table 2. By using these resins, the corresponding toners T4 and T5 were prepared in the same manner as in Example 1 except that 1% by weight of Aerosil (trade mark) R-972 (silica, manufactured by Nippon Aerosil K.K.) relative to 100% by weight of the toner was added during the melt mixing. Both toners showed excellent toner properties.

TABLE 2

| Resins | | | R4 | R5 (Unit: mol %) |
| --- | --- | --- | --- | --- |
| Mol ratio of entire alcohols to entire carboxylic acids | | | 1.5 | 15 |
| Acid components | Dicarboxylic acid | Terephthalic acid | 60 | 60 |
| | | Isophthalic acid | 40 | 40 |
| Alcohol components | Polyhydric alcohol | Pentaerythritol | | |
| | | Trimethylol propane | 30 | 48 |
| | Aromatic diol | Diol A (*1) | 40 | 40 |
| | Aliphatic diol | Ethylene glycol | 30 | 12 |
| Physical properties of resins | | Softening temp. (°C.) | 111 | 109 |
| | | Tg (°C.) | 40 | 37 |
| | | Acid value (mgKOH/g) | 1.08 | 1.11 |

TABLE 2-continued

| Resins | (Unit: mol %) | |
|---|---|---|
| | R4 | R5 |
| Gel content (%) | 21.0 | 21.2 |

(*1) Diol A: Polyoxypropylene (2.2)-2,2-bis(4-hydroxyphenyl)propane

TABLE 2-1

| Toners | | T4 | | | T5 | | |
|---|---|---|---|---|---|---|---|
| Offset resistance | | 145–230 | | | 144–220 | | |
| Fixing properties | | A | | | A | | |
| Blocking resistance | | C | | | C | | |
| Copying conditions & image qualities | Temp. (°C.) | 20 | 10 | 35 | 20 | 10 | 35 |
| | Humidity (%) | 60 | 15 | 85 | 60 | 15 | 85 |
| | Image quality | A | B | B | B | B | B |

COMPARATIVE EXAMPLE 2

Resins R6 and R7 were prepared in the same manner as in Example 1 except that trimethylolpropane was used as the polyhydric alcohol and the composition of monomers was changed as shown in Table 3. The physical properties of these resins are shown in Table 3. By using these resins, the corresponding toners T6 and T7 were prepared in the same manner as in Example 1. The toner properties thereof are shown in Table 3-1.

With toner T6 wherein trimethylolpropane was used in an amount of only 0.3 mol %, the non-offset width was nil, and copying was impossible. Whereas, with toner T7 wherein trimethylolpropane was used in an amount of 55 mol %, the blocking resistance was poor, and blocking took place even when 1% by weight of Aerosil R-972 was added, and the toner was found to be practically useless.

TABLE 3

| Resins | | | (Unit: mol %) | |
|---|---|---|---|---|
| | | | R6 | R7 |
| Mol ratio of entire alcohols to entire carboxylic acids | | | 1.2 | 1.8 |
| Acid components | Dicarboxylic acid | Terephthalic acid | 60 | 60 |
| | | Isophthalic acid | 40 | 40 |
| Alcohol components | Polyhydric alcohol | Trimethylol propane | 0.3 | 55 |
| | Aromatic diol | Diol A (*1) | 20 | 10 |
| | Aliphatic diol | Ethylene glycol | 79.7 | 35 |
| Physical properties of resins | | Softening temp. (°C.) | 184 | 108 |
| | | Tg (°C.) | 68 | 19 |
| | | Acid value (mgKOH/g) | 1.72 | 1.78 |
| | | Gel content (%) | 0.8 | 22.1 |

(*1) Diol A: Polyoxypropylene (2.2)-2,2-bis(4-hydroxyphenyl)propane

TABLE 3-1

| Toners | | T6 | | | T7 | | |
|---|---|---|---|---|---|---|---|
| Offset resistance | | No width | | | Copying impossible | | |
| Fixing properties | | Copying impossible | | | Copying impossible | | |
| Blocking resistance | | A | | | E | | |
| Copying conditions & image qualities | Temp. (°C.) | 20 | 10 | 35 | 20 | 10 | 35 |
| | Humidity (%) | 60 | 15 | 85 | 60 | 15 | 85 |
| | Image quality | — | — | — | — | — | — |

COMPARATIVE EXAMPLE 3

To a monomer mixture having the composition of monomers as identified in Table 4 and having a molar ratio of the diol component to the entire carboxylic acids of 1.00, 0.03 mol %, based on the carboxylic acids, of tin oxide was added as a polymerization catalyst. The mixture was introduced into the same separable flask as used in Example 1 and heated to 220° C. for dehydration condensation. When distilled water was removed to some extent, the viscosity of the reaction system started to increase rapidly, and about 5 minutes later, the entire system turned into a gelled state, whereby it was impossible to stop the condensation reaction at a viscosity for the polymer to be withdrawn from the reactor. In an industrial production, it usually takes from 30 minutes to one hour to withdraw a product of this nature from the reactor, and therefore the above process is not practically useful.

However, this Comparative Example is an experiment on a small scale, and in order to examine the resin properties and toner properties of products, the products were forcibly taken out during the rapid increase of the viscosity and cooled to stop the reaction to obtain resins R8, R9 and R10. The physical properties of these resins are shown in Table 4. From these resins, the corresponding toners T8, T9 and T10 were prepared, respectively, in the same manner as in Example 1. The toner properties thereof are shown in Table 4-1.

The toners obtained from these resins having high acid values all had high humidity dependency of the image quality and were found to be practically useless.

TABLE 4

| Resins | | | (Unit: mol %) | | |
|---|---|---|---|---|---|
| | | | R8 | R9 | R10 |
| Mol ratio of entire alcohols to entire carboxylic acids | | | 1.0 | 0.91 | 0.95 |
| Acid components | Dicarboxylic acid | Terephthalic acid | 60 | 60 | 60 |
| | | Isophthalic acid | 40 | 40 | 40 |
| Alcohol components | Polyhydric alcohol | Trimethylol propane | 40 | 20 | 30 |
| | Aromatic diol | Diol A (*1) | 20 | 20 | 20 |
| | Aliphatic diol | Ethylene glycol | 40 | 60 | 50 |
| Physical properties of resins | | Softening temp. (°C.) | 142 | 138 | 151 |
| | | Tg (°C.) | 35 | 51 | 44 |

TABLE 4-continued

| | (Unit: mol %) | | |
|---|---|---|---|
| Resins | R8 | R9 | R10 |
| Acid value (mgKOH/g) | 24 | 28 | 21 |
| Gel content (%) | 7.2 | 12.3 | 15.7 |

(*1) Diol A: Polyoxypropylene (2.2)-2,2-bis(4-hydroxyphenyl)propane

TABLE 4-1

| | | Comparative Example 3 | | | | | | | |
|---|---|---|---|---|---|---|---|---|---|
| Toners | | T8 | | | T9 | | | T10 | |
| Offset resistance | | 152–230 | | | 147–240 | | | 167–240 | |
| Fixing properties | | B | | | B | | | A | |
| Blocking resistance | | E | | | C | | | D | |
| Copying conditions & image qualities | Temp. (°C.) | 20 | 10 | 35 | 20 | 10 | 35 | 20 | 10 | 35 |
| | Humidity (%) | 60 | 15 | 85 | 60 | 15 | 85 | 60 | 15 | 85 |
| | Image quality | B | D | E | B | D | E | B | D | E |

EXAMPLE 3

Resins R11, R12 and R13 were prepared in the same manner as in Example 1 except that the composition of the monomers and the molar ratio of the entire diol components to the entire carboxylic acids were changed as shown in Table 5. The physical properties of these resins are shown in Table 5. By using these resins, the corresponding toners T11, T12 and T13 were prepared in the same manner as in Example 1. The toner properties thereof are shown in Table 5-1.

It is apparent from Table 5-1, good toner properties were obtained at softening temperatures of 135° C. and 164° C., whereas the offset starting temperature tended to be low at a level of 170° C. at a softening temperature of 98° C.

COMPARATIVE EXAMPLE 4

Resins R14 and R15 were prepared in the same manner as in Example 1 except that the composition of monomers and the molar ratio of the entire diol components to the entire carboxylic acids were changed as shown in Table 5. The physical properties of these resins are shown in Table 5. By using these resins, the corresponding toners T14 and T15 were prepared in the same manner as in Example 1. The toner properties thereof are shown in Table 5-1.

It is apparent from Table 5-1 that when the softening temperature exceeds 170° C., the fixing properties tend to be extremely poor, and the image quality tends to deteriorate, and when the softening temperature is lower than 90° C., the non-offset width is insufficient and the toner is not practically useful.

TABLE 5

| | | | (Unit: mol %) Example 3 | | | Comparative Example 4 | |
|---|---|---|---|---|---|---|---|
| Resins | | | R11 | R12 | R13 | R14 | R15 |
| Mol ratio of entire alcohols to entire carboxylic acids | | | 1.5 | 1.5 | 1.5 | 1.5 | 1.5 |
| Acid components | Dicarboxylic acid | Terephthalic acid | 60 | 60 | 60 | 60 | 60 |
| | | Isophthalic acid | 40 | 40 | 40 | 40 | 40 |
| Alcohol components | Polyhydric alcohol | Trimethylol propane | 25 | 10 | 5 | 2 | 10 |
| | Aromatic diol | Diol A | 40 | 20 | 10 | | 50 |
| | Aliphatic diol | Ethylene glycol | 35 | 70 | 85 | 98 | 40 |
| Physical properties of resins | | Softening temp. (°C.) | 98 | 135 | 164 | 172 | 88 |
| | | Tg (°C.) | 52 | 60 | 62 | 64 | 58 |
| | | Acid value (mgKOH/g) | 1.8 | 1.7 | 1.2 | 1.7 | 1.2 |
| | | Gel content (%) | 13 | 8.0 | 4.7 | 3.0 | 1.0 |

TABLE 5-1

| | | Example 3 | | | | | | | | Comparative Example 4 | | | | | |
|---|---|---|---|---|---|---|---|---|---|---|---|---|---|---|---|
| Toners | | T11 | | | T12 | | | T13 | | T14 | | | T15 | | |
| Offset resistance | | 143–170 | | | 155–240 | | | 160–220 | | 182–210 | | | No width | | |
| Fixing Properties | | A | | | B | | | B | | D | | | Copying impossible | | |
| Blocking resistance | | C | | | A | | | B | | A | | | B | | |
| Copying conditions & image qualities | Temp. (°C.) | 20 | 10 | 35 | 20 | 10 | 35 | 20 | 10 | 35 | 20 | 10 | 35 | 20 | 10 | 35 |
| | Humidity (%) | 60 | 15 | 85 | 60 | 15 | 85 | 60 | 15 | 85 | 60 | 15 | 85 | 60 | 15 | 85 |
| | Image quality | B | B | B | A | B | B | B | B | B | B | B | C | — | — | — |

EXAMPLE 4

Resins R16, R17 and R18 were prepared in the same manner as in Example 1 except that the composition of monomers and the molar ratio of the entire diol components to the entire carboxylic acids were changed as shown in Table 6. The physical properties of these resins are shown in Table 6. By using these resins, the corresponding toners T16, T17 and T18 were prepared in the same manner as in Example 1. The toner properties thereof are shown in Table 6-1. However, in the case of resin R18, 1% by weight of Aerosil R-972 relative to 100% by weight of the toner was incorporated during the production of the toner.

When resins having T9 of 40°, 60° and 70° C. were used, the balance of the physical properties was good, and the image quality was excellent.

COMPARATIVE EXAMPLE 5

Resins R19 and R20 were prepared in the same manner as in Example 1 except that the composition of monomers and the molar ratio of the entire diol components to the entire carboxylic acids were changed as shown in Table 6. The physical properties of these resins are shown in Table 6. By using these resins, the corresponding toners T19 and T20 were prepared in the same manner as in Example 1. The toner properties thereof are shown in Table 6-1.

It is apparent from Table 6-1 that when Tg is 75° C., the fixing properties are poor, and when Tg is 27° C., the blocking resistance is poor and the toner is not practically useful.

toner tends to be extremely poor, but also the fixing properties tends to be poor, and the toner is not practically useful.

TABLE 7

|  |  |  | (Unit: mol %) Comparativ x Example 6 | |
|---|---|---|---|---|
| Resins |  |  | R21 | R22 |
| Mol ratio of entire alcohols to entire carboxylic acids |  |  | 1.5 | 1.5 |
| Acid components | Dicarboxylic acid | Terephthalic acid | 50 | 50 |
|  |  | Isophthalic acid | 50 | 50 |
| Alcohol components | Polyhydric alcohol | Trimethylol propane | 3 | 7 |
|  | Aromatic diol | Diol A (*1) | 20 | 20 |
|  | Aliphatic diol | Ethylene glycol | 77 | 73 |
| Physical properties | Final torque (kg-cm) |  | 0.5 | 13.0 |
|  | Softening temp. (°C.) |  | 131 | 168 |

TABLE 6

|  |  |  | Example 4 | | | (Unit: mol %) Comparative Example 5 | |
|---|---|---|---|---|---|---|---|
| Resins |  |  | R16 | R17 | R18 | R19 | R20 |
| Mol ratio of entire alcohols to entire carboxylic acids |  |  | 1.5 | 1.5 | 1.5 | 1.5 | 1.5 |
| Acid components | Dicarboxylic acid | Terephthalic acid | 60 | 60 | 60 | 60 | 60 |
|  |  | Isophthalic acid | 40 | 40 | 40 | 40 | 40 |
| Alcohol components | Polyhydric alcohol | Pentaerythritol | 1.5 | 3 | 10 | 1 | 30 |
|  | Aromatic diol | Diol A (*1) | 30 | 20 | 20 | 50 | 10 |
|  | Aliphatic diol | Ethylene glycol | 68.5 | 77 | 70 | 49 | 70 |
| Physical properties of resins | Softening temp. (°C.) |  | 163 | 145 | 123 | 165 | 106 |
|  | Tg (°C.) |  | 70 | 60 | 40 | 75 | 27 |
|  | Acid value (mgKOH/g) |  | 1.5 | 2.1 | 1.1 | 1.0 | 1.1 |
|  | Gel content (%) |  | 2.7 | 9.2 | 12.5 | 0.8 | 17.8 |

(*1) Diol A: polyoxypropylene (2.2)-2,2-bis(4-hydroxyphenyl) propane

TABLE 6-1

|  |  | Example 3 | | | | | | | | Comparative Example 4 | | | | | |
|---|---|---|---|---|---|---|---|---|---|---|---|---|---|---|---|
| Toners |  | T16 | | | T17 | | | T18 | | | T19 | | | T20 | |
| Offset resistance |  | 160–210 | | | 155–240 | | | 147–240 | | | 180–210 | | | Copying impossible | |
| Fixing Properties |  | B | | | B | | | A | | | D | | | Copying impossible | |
| Blocking resistance |  | A | | | A | | | C | | | A | | | E | |
| Copying conditions & image qualities | Temp. (°C.) | 20 | 10 | 35 | 20 | 10 | 35 | 20 | 10 | 35 | 20 | 10 | 35 | 20 | 10 | 35 |
|  | Humidity (%) | 60 | 15 | 85 | 60 | 15 | 85 | 60 | 15 | 85 | 60 | 15 | 85 | 60 | 15 | 85 |
|  | Image quality | A | B | B | A | B | B | A | A | B | B | C | C | E | E | E |

COMPARATIVE EXAMPLE 6

Resins R21 and R22 were prepared in the same manner as in Example 1 except that the composition of monomers, the molar ratio of the entire diol components to the entire carboxylic acids and the final torque were as shown in Table 7. By using these resins, the corresponding toners T21 and T22 were prepared in the same manner as in Example 1. The toner properties thereof are shown in Table 7-1.

It is apparent from Table 7-1 that with the resin having a gel content of 0.8, the offset starting temperature is extremely low, and the toner is not practically useful. Further, when the gel content exceeds 40, not only the pulverization property during the preparation of the

| of resins | Tg (°C.) | 67.0 | 53.0 |
|---|---|---|---|
|  | Acid value (mgKOH/g) | 3.51 | 1.08 |
|  | Gel content (%) | 0.8 | 40.8 |

(*1) Diol A: Polyoxypropylene (2.2)-2,2-bis(4-hydroxyphenyl)propane

TABLE 7-1

| Toners |  | T21 | | | T22 | | |
|---|---|---|---|---|---|---|---|
| Offset resistance |  | 156–162 | | | 172–240 | | |
| Fixing properties |  | B | | | D | | |
| Blocking resistance |  | A | | | B | | |
| Copying conditions & image | Temp. (°C.) | 20 | 10 | 35 | 20 | 10 | 35 |
|  | Humidity (%) | 60 | 15 | 85 | 60 | 15 | 85 |
|  | Image | A | B | B | B | B | C |

EXAMPLE 5

Dimethyl adipate, dimethyl terephthalate, pentaerythritol, ethylene glycol and neopentyl glycol were introduced into a reactor having a distillation column in the proportions as identified in Table 8. Further, titanium butoxide was added in an amount of 0.08% by weight based on the entire carboxylic acid components, and the ester interchange reaction was conducted under atmospheric pressure for 5 hours while maintaining the internal temperature at a level of 230° C. and the rotational speed of the stirrer at a level of 200 rpm. Methanol was no longer distilled from the distillation column. The stirring torque at that time was 0.8 kg-cm. Then, while maintaining the internal temperature at 235° C. and the stirring rotational speed at 200 rpm, the pressure in the reaction system was reduced to 3.0 mmHg, whereby the diol component was distilled under reduced pressure. As the diol component was distilled from the reaction system, the stirring torque gradually increased. When the stirring torque reached 1.5 kg-cm, gelation started, whereby the stirring torque started to increase rapidly. Therefore, the pressure of the reaction system was increased at a rate of 1.5 mmHg/min, whereby the viscosity gradually increased, and 20 minutes later, the stirring torque reached 4 kg-cm. Then, the pressure of the reaction system was returned to atmospheric pressure, whereupon the termination of the reaction was confirmed, and resin R23 was obtained.

This Example shows that also in the case where an ester interchange method is employed, it is possible to control the stirring torque i.e. the viscosity after the reaction system reaches the gelation point, or in short, it is possible to control the gelation reaction, by continuously controlling the pressure of the reaction system.

By using the above resin, toner T23 was prepared in the same manner as in Example 1. The toner properties thereof are shown in Table 8-1.

TABLE 8

| Resin | | | R23 (Unit: mol %) |
|---|---|---|---|
| Mol ratio of entire alcohols to entire carboxylic acids | | | 1.5 |
| Acid components | Dicarboxy-acid | Dimethyl adipate | 50 |
| | | Dimethyl terephthalate | 50 |
| Alcohol components | POlyhydric alcohol | Pentaerythritol | 20 |
| | Aliphatic diol | Ethylene glycol | 40 |
| | | Neopentyl glycol | 40 |
| Physical properties of resin | | Softening temp. (°C.) | 105 |
| | | Tg (°C.) | 41 |
| | | Acid value (mgKOH/g) | 1.50 |
| | | Gel content (%) | 21.0 |

TABLE 8-1

| Toner | | T23 | | |
|---|---|---|---|---|
| Offset resistance | | 145–240 | | |
| Fixing properties | | A | | |
| Blocking resistance | | C | | |
| Copying conditions & image qualities | Temp. (°C.) | 20 | 10 | 35 |
| | Humidity (%) | 60 | 15 | 85 |
| | Image quality | A | B | B |

We claim:

1. A polyester resin for toner, which consists essentially of (a) from 0.5 to 50 mol %, based on the entire alcohol components, of at least one trihydric or higher polyhydric alcohol, (b) from 50 to 99.5 mol %, based on the entire alcohol components, of at least one diol and (c) at least one member selected from the group consisting of dicarboxylic acids and lower alkyl esters thereof, and which has a softening temperature of from 90° to 170° C., a glass transition temperature (T9) of from 30° to 70° C., an acid value of from 0.5 to 15 mgKOH/g and a gel content of from 1.5 to 40%.

2. The polyester resin according to claim 1, wherein said trihydric or higher polyhydric alcohol (a) is in an amount of from 1 to 35 mol %, based on the entire alcohol components.

3. The polyester resin according to claim 1, wherein the softening temperature is from 100° to 160° C.

4. The polyester resin according to claim 1, wherein the glass tansition temperature (T9) is from 50° to 70° C.

* * * * *